United States Patent [19]
Mori

[11] Patent Number: 6,098,084
[45] Date of Patent: Aug. 1, 2000

[54] METHOD AND APPARATUS FOR VISUALLY INDICATING STATUS OF A DATASET WHEN PRESENTING PORTIONS OF THE DATASET

[75] Inventor: Robert F. Mori, Menlo Park, Calif.

[73] Assignee: Sun Microsystem, Inc., Palo Alto, Calif.

[21] Appl. No.: 08/746,615

[22] Filed: Nov. 12, 1996

[51] Int. Cl.[7] .................................................. G06F 17/21
[52] U.S. Cl. ........................................ 707/526; 345/113
[58] Field of Search .................................... 707/529, 526, 707/528, 530; 345/430–431, 113, 114, 117; 213/200; 380/4

[56] References Cited

U.S. PATENT DOCUMENTS

| | | | |
|---|---|---|---|
| 5,877,741 | 3/1999 | Chee et al. | 345/113 |
| 5,909,539 | 6/1999 | Chikauchi | 707/528 X |
| 5,933,498 | 8/1999 | Schneck et al. | 380/4 |
| 5,960,448 | 9/1999 | Reichek et al. | 707/526 |
| 5,974,548 | 10/1999 | Adams | 713/200 |

OTHER PUBLICATIONS

Cox et al, "A secure, imperceptible yet perceptibly salient, spread sprectrum watermark for multimedia", Southcon/96 Conference, IEEE, pp. 192–197, ISBN# 0–7803–3268–7, Jun. 1996.

Hampton et al, "Creating Commercial Web Sites", Sams, Macmillan Computer Publishing, ISBN: 1575211696, Ch. 12 (Working with Graphics), Nov. 1996.

Borland, Quattro Pro 4 User's Guide, pp. 198–201,224–225, 1992.

Thorell et al., Using Computer Color Effectively, pp. 88, 135,212, 1990.

*Primary Examiner*—Joseph H. Feild
*Attorney, Agent, or Firm*—Holland & Hart LLP

[57] ABSTRACT

Methods, systems, apparatus and computer program products are disclosed that provide users of programmed applications with a visual indication of a state relating to the datasets accessed by the application. This indication is accomplished by presenting a background indicative of the state along with the presentation of a portion of the information in the dataset.

16 Claims, 7 Drawing Sheets

MAIN Library^M
^M
| File Name | Size | Date | Description^M |
|---|---|---|---|
| ALLFILES | 1.8M | 09/07/95 | Text File That Lists All Files on FedWorld^M This ASC11 text file contains a list of all^M files on the FedWorld Network. This file^M is updated each morning at 5 a.m. east coast^M time.^M |
| ALLFILES.ZIP | 388K | 09/07/95 | Compressed File That Lists All Files on FedWorld^M This file, compressed with PKZ204g.EXE, contains ^M a single ASC11 text that lists all files^M available on the FedWorld Network. This zip^M file is updated each morning at 5 a.m. east coast^m time.^M |
| BBSUSER.DOC | 105K | 12/05/93^M | |
| CONG104.TXT | 59K | 01/20/95 | 104th Congress/Senate/Committe Information^M Phone/Fax Numbers, e-mail addresses, Room numbers^M Keywords: Health, Business, Admin, Science^M |
| DAVBACN.GDE | 15K | 12/16/94 | User Guide for the Davis Bacon Wage Determination^M database^M |
| FAA-AD.TEt | 17K | 06/21/94 | Users Guide for the FAA Airworthiness directives^M |

"main.1st" 51 lines, 3178 characters

Fig. 1a
*(Prior Art)*

MAIN Library^M
^M

| File Name | Size | Date | Description^M |
|---|---|---|---|
| ALLFILES | 1.8M | 09/07/95 | Text File That Lists All Files on FedWorld^M This ASC11 text file contains a list of all^M files on the FedWorld Network. This file^M is updated each morning at 5 a.m. east coast^M time.^M |
| ALLFILES.ZIP | 388K | 09/07/95 | Compressed File That Lists All Files on FedWorld^M This file, compressed with PKZ204g.EXE, contains ^M a single ASC11 text that lists all files^M available on the FedWorld Network. This zip^M file is updated each morning at 5 a.m. east coast^m time.^M |
| BBSUSER.DOC | 105K | 12/05/93^M | |
| CONG104.TXT | 59K | 01/20/95 | 104th Congress/Senate/Committe Information^M Phone/Fax Numbers, e-mail addresses, Room numbers^M Keywords: Health, Business, Admin, Science^M |
| DAVBACN.GDE | 15K | 12/16/94 | User Guide for the Davis Bacon Wage Determination^M database^M |
| FAA-AD.TXT | 17K | 06/21/94 | Users Guide for the FAA Airworthiness directives^M |

"main.pro [Read only] 51 lines, 3178 characters

*Fig. 1b*
*(Prior Art)*

^M
this is a test
of adding text to a read only file using vi
MAIN Library^M
^M

| File Name | Size | Date | Description^M |
|---|---|---|---|
| ALLFILES | 1.8M | 09/07/95 | Text File That Lists All Files on FedWorld^M This ASC11 text file contains a list of all^M files on the FedWorld Network. This file^M is updated each morning at 5 a.m. east coast^M time.^M |
| ALLFILES.ZIP | 388K | 09/07/95 | Compressed File That Lists All Files on FedWorld^M This file, compressed with PKZ204g.EXE, contains ^M a single ASC11 text that lists all files^M available on the FedWorld Network. This zip^M file is updated each morning at 5 a.m. east coast^M time.^M |
| BBSUSER.DOC | 105K | 12/05/93^M | |
| CONG104.TXT | 59K | 01/20/95 | 104th Congress/Senate/Committe Information^M Phone/Fax Numbers, e-mail addresses, Room numbers^M Keywords: Health, Business, Admin. Science^M |
| DAVBACN.GDE | 15K | 12/16/94 | User Guide for the Davis Bacon Wage Determination^M |

```
^M
this is a test
of adding text to a read only file using vi
MAIN Library^M
^M
File Name    Size    Date        Description^M
=========    ====    ====        ===========^M ALLFILES     1.8M    09/07/95    Text File That Lists All Files on FedWorld^M This ASC11 text file
                                 contains a list of all^M files on the FedWorld Network. This file^M
                                 is updated each morning at 5 a.m. east coast^m time.^M ALLFILES.ZIP 388K    09/07/95    Compressed File That Lists All Files on FedWorld^M This file,
                                 compressed with PKZ204g.EXE, contains ^M a single ASC11 text
                                 that lists all files^M available on the FedWorld Network. This zip^M
                                 file is updated each morning at 5 a.m. east coast^m time.^M

BBSUSER.DOC  105K    12/05/93^M

CONG104.TXT  59K     01/20/95    104th Congress/Senate/Committe Information^M Phone/Fax
                                 Numbers, e-mail addresses, Room numbers^M Keywords: Health,
                                 Business, Admin, Science^M DAVBACN.GDE  15K     12/16/94    User Guide for the Davis Bacon Wage Determination^M
```

*Fig. 4a*

```
^M
this is a test
of adding text to a read only file using vi
MAIN Library^M
^M
File Name    Size    Date       Description^M
========     ====    ====       ===========^M
ALLFILES     1.8M    09/07/95   Text File That Lists All Files on FedWorld^M This ASC11 text file
                                contains a list of all^M files on the FedWorld Network. This file^M
                                is updated each morning at 5 a.m. east coast^M time.^M ALLFILES.ZIP 388K    09/07/95   Compressed File That Lists All Files on FedWorld^M This file,
                                compressed with PKZ204g.EXE, contains ^M a single ASC11 text
                                that lists all files^M available on the FedWorld Network. This zip^M
                                file is updated each morning at 5 a.m. east coast^m time.^M

BBSUSER.DOC  105K    12/05/93^M

CONG104.TXT  59K     01/20/95   104th Congress/Senate/Committee Information^M Phone/Fax
                                Numbers, e-mail addresses, Room numbers^M Keywords: Health,
                                Business, Admin, Science^M DAVBACN.GDE  15K     12/16/94   User Guide for the Davis Bacon Wage Determination^M
```

METHOD AND APPARATUS FOR VISUALLY INDICATING STATUS OF A DATASET WHEN PRESENTING PORTIONS OF THE DATASET

BACKGROUND OF THE INVENTION

FIELD OF THE INVENTION

This invention relates to the field of information display and manipulation. Specifically, this invention is a new and useful method, apparatus, system and computer program product for presenting the status of a dataset along with portions of the dataset.

BACKGROUND

Many computer program applications provide a user with access to information. This information includes data stored in one or more database files, textual information stored in text data files and, among others, graphical information stored in graphical data files. The information in these datasets is accessed by the programmed application by using operating system facilities and/or input/output libraries. Often the datasets exist in a filesystem controlled by the computer executing the programmed application. Further, the datasets often exist in a filesystem that is remote from the computer executing the application. Many of these programmed applications provide the user with the capability to modify the datasets accessed by the programmed application. For example a text editor, such as "vi" or "emacs", provides the user with the ability to edit files. Similarly database and graphic applications along with many other applications provide the facilities that allow a user to access and modify the application's dataset.

There are many reasons for restricting access to particular datasets. The information in the dataset may be confidential—thus, only those who are privileged to the information should have access. The information may be under the control of a particular group. That group would have both read access and write/modify access to the data. Others would only have read access. This situation often occurs in programming project source control circumstances. There are many similar limited access requirements to datasets.

Often, the dataset that contains the information is protected so that an unauthorized user cannot modify the information within the dataset. This protection can be accomplished by limiting access to the dataset (for example by only allowing read access to a file encompassed by the dataset), by providing protection information within the dataset that is maintained and recognized by the application, and that limits the application's use of the dataset depending on an access code or user identification, and by many other methods well understood in the art.

Some applications present the user with a status indicator representing a relevant status of a dataset. For example when Microsoft's Word® application opens a read-only file, the window header bar indicates the read-only nature of the opened file. On Unix systems, the emacs text editor provides a textual message in a status area that indicates a read-only file. Another common UNIX text editor (vi) provides a status line at the bottom of the display when the file is initially opened. Some text editor programs provide an audible error indicator when a user attempts to add text to a read-only dataset and restrict the user from modifying the presented information. Some applications do not provide this warning and may allow users to modify the displayed information without any warning. Then, when the user is ready to save the changes made to the dataset, the application displays an error message and prohibits the user from updating the dataset.

Although the "vi" text editor initially displays the read-only status of a protected file, the warning message is easily missed. This is because the message is removed from the display device by any of a number of operations. These operations include moving the lower part of the window containing the warning off the display device or under another window. Further, "vi" positioning operations cause the "vi" text editor to remove the read-only warning message. For many "vi" users, the first indication that the file is read-only is after the user has made extensive edits to the displayed information and attempts to save the file. At this time, the user must take a number of additional steps to save the changes made to the displayed portion of the dataset.

FIG. 1a illustrates a prior art window 101 used by the "vi" text editor to present a portion of a file on a display unit to a user who has read/write access to the file. This window 101 presents a plurality of textual information 103, The textual information 103 also includes information presented in a status area 105. The information in this status area 105 indicates that the textual information 103 is from a file named "main.1st", and that the file contains 51 lines and 3178 characters.

FIG. 1b illustrates a prior art window 111 used by the "vi" text editor to present a portion of a file on a display unit to a user who does not have write access to the file. This window 111 presents a plurality of textual information 113, The textual information 113 also includes information presented in a status area 115. The status area 115 now indicates that the textual information 113 displayed in the window 111 is from a file named "main.pro", that the file is read-only, and that the file contains 51 lines and 3178 characters.

FIG. 1c illustrates a prior art window 121 similar to the one described for FIG. 1b. However, now the user has inserted a plurality of new textual data 123 within the window 121. This operation has caused the "vi" text editor to remove the status area 115 shown in FIG. 1b. Thus, the user cannot tell whether the information displayed in the window 121 is contained in a read-only file.

One skilled in the art will understand that similar problems occur with protected database records and other applications that access datasets.

SUMMARY OF THE INVENTION

The present invention provides an economical method, system, apparatus, and computer program product for presenting the state of a dataset to a user. One aspect of the invention is a computer controlled method visually indicating the state of a dataset when presenting the dataset. The method includes opening a dataset, determining the state of the dataset, presenting a background representative of the state of the dataset on a display unit and presenting a portion of the data set with the background on the display unit.

In another aspect of the invention, a system for visually indicating a state of a presented dataset is disclosed. The system includes a computer and a display unit. The system also includes a dataset opening mechanism that opens the dataset. The system includes a state determination mechanism that determines the state of the dataset opened by the dataset opening mechanism. The system also includes a background presentation mechanism that uses this state to present a background on the display unit that represents the state of the dataset. The system includes a dataset presentation mechanism that presents a portion of the dataset with the background on the display unit such that the background indicates the state of the portion of the dataset that is displayed on the display unit.

In yet another aspect of the invention, a data access apparatus for visually indicating the state of a dataset when presenting the dataset with a computer is disclosed. This apparatus includes a computer having a CPU, memory, and a display unit. The apparatus also includes a dataset opening mechanism that is configured to open the dataset. Additionally, the apparatus includes a state determination mechanism configured to determine the state of the dataset opened by the dataset opening mechanism. A background presentation mechanism is configured to present a background on the display unit that represents the state determined by the state determination mechanism. The apparatus also includes a dataset presentation mechanism that is configured to present a portion of the dataset. This presentation mechanism is presented on the display unit along with the background representing the state of the dataset.

Yet a further aspect of the invention is a computer program product embedded on a computer usable medium for causing a computer to visually indicate the state of a dataset when presenting the dataset. When executed on a computer, the computer readable code causes a computer to effect a dataset opening mechanism, a state determination mechanism, a background presentation mechanism and a dataset presentation mechanism. Each of the mechanisms having the same functions as the corresponding mechanisms described above for the data access apparatus.

The foregoing and many other aspects and advantages of the present invention will no doubt become obvious to those of ordinary skill in the art after having read the following detailed description of the preferred embodiments that are illustrated in the various drawing figures.

DESCRIPTION OF THE DRAWINGS

FIGS. 1a, b & c illustrate a prior art presentation of textual data from a dataset;

FIGS. 4a & b illustrate the presentation of information and state from a dataset in accordance with a preferred embodiment.

DESCRIPTION OF THE PREFERRED EMBODIMENTS

Notations and Nomenclature

The following "notations and nomenclature" are provided to assist in the understanding of the present invention and the preferred embodiments thereof.

Dataset—A data source or plurality of data sources accessible by programmed logic in a computer. A dataset consists of a single file or database, or a plurality of mixed files, databases, or other data sources.

Window—An area, usually rectangular, on a computer display device controlled by an application.

Watermark—A word or symbol presented with the information on the display unit (generally in a window) that is discernible from but not obscuring the information.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

Figure 2:
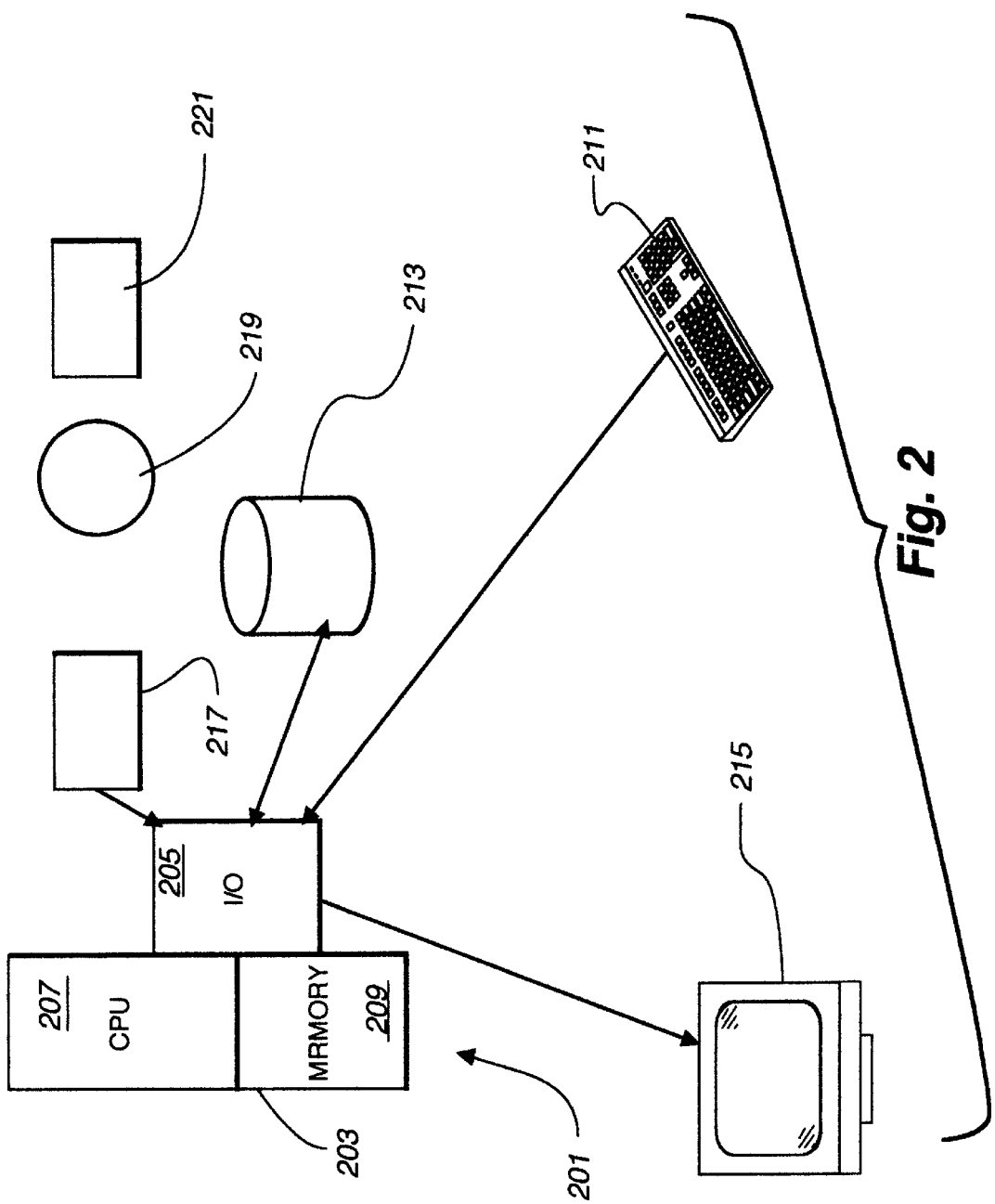
FIG. 2 illustrates a computer system capable of using the invention in accordance with a preferred embodiment.

FIG. 2 illustrates a computer system, indicated by the general reference character 201. This computer system 201 is capable of performing the invention. The computer system 201 includes a processor 203, having an Input/Output ("I/O") section 205, a central processing unit ("CPU") 207 and a memory section 209. The I/O section 205 is connected to a keyboard 211, a disk storage unit 213, a display unit 215, and a CD-ROM drive unit 217. The CD-ROM unit 217 can read a CD-ROM medium 219 that typically contains programs and data 221. The CD-ROM medium 219, when loaded in the CD-ROM unit 217, and the disk storage unit 213 each separately comprises a filestorage mechanism. Such a computer system is capable of executing applications that embody the invention.

A Preferred Embodiment

The invention provides an obvious indication of a state of a dataset that is presented to a user. One preferred embodiment of the invention is within the context of a text editing program such as "vi" or "emacs". However, one skilled in the art will understand that the invention, as described below, can be applied to many other computerized methods, applications, systems and computer programming products such as, but no limited to, word processing applications, database applications, graphical applications, and other applications where a dataset can be accessed by a user.

Figure 3:
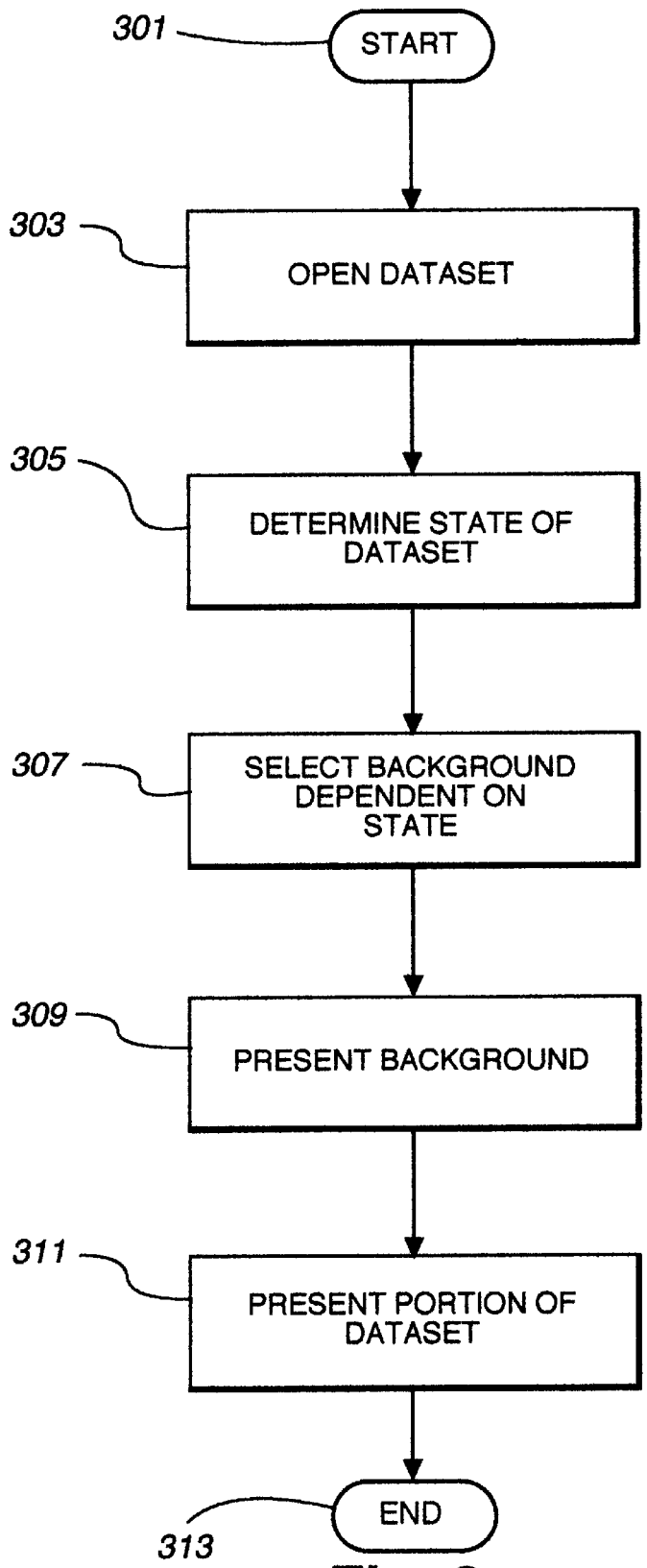
FIG. 3 illustrates the steps used by the invention in accordance with a preferred embodiment.

FIG. 3 illustrates the process that embodies the invention. The process initiates at a "Start" terminal 301 and continues to an "Open Dataset" procedure 303. The "Open Dataset" procedure 303 opens a dataset by invoking well-known system and/or library facilities to open one or more files. Next, a "Determine State of Dataset" procedure 305 determines the state of the dataset. In one preferred embodiment, that of a text editing program, the state is often specified by the read-write access attributes of the user with respect to the file opened by the user. In another preferred embodiment, that of a database program, the state is dependent on conditions internal to the dataset (for example, a user access code).

The process continues to a "Select Background Dependent on State" procedure 307. This procedure 307 selects a background that represents the state of the dataset that was found in the "Determine State of Dataset" procedure 305. This background can be a fixed or user specified color, texture, watermark, or other indication of the state of the dataset. The background can be displayed "under" the display of the information in a window so that the background shows through the "white space" of the displayed information, as a colored window border, or by using other indicators to show the state of the dataset. In a preferred embodiment, the background for a read-only dataset is a light gray color. The color light enough that black text is easily readable, but dark enough for the user to immediately notice the difference between a read-only dataset display with the light gray background color and a read-write dataset displayed with a white background.

Once the background is selected by the "Select Background Dependent on State" procedure 307, the process continues to a "Present Background" procedure 309 that presents the selected background on a display unit. Next, at a "Present Portion of Dataset" procedure 311 the process displays, over the selected background, a portion of the dataset. In a preferred embodiment of a text editor, such as "vi", this procedure 311 presents the text of a file over the background. Finally, the process completes through an "End" terminal 313. Other preferred embodiments of the invention use a texture, a pattern or a watermark for the background. Other preferred embodiments of the invention color the frame defining a window on the display unit. Thus, a color, a watermark, a pattern, a frame or a texture all have the common property that status information related to the dataset information can be presented to the user with the information from the dataset.

FIGS. 4a and 4b illustrate displays of information using the above described invention. FIG. 4a illustrates a window 401 used by the "vi" text editor to present a portion of a file on a display unit to a user who has read-only access to the file, and who has modified the displayed information 403 by adding a plurality of new textual data 405. Even though the status area has been removed from the display, the user can still determine that the displayed data has a read-only state because the background color 407 indicates that the data is read-only.

FIG. 4b illustrates the same situation, but using a watermark instead of a color to indicate the state of the data. A window 411 similar to the one described for FIG. 4a contains displayed information 413 and a plurality of new textual data 415. The window 411 also includes a watermark 417 that indicates that the data is read-only. The watermark 417 stays in the same location on the screen and does not scroll with the displayed information.

One skilled in the art will understand that the invention as described above teaches a method, system, apparatus and computer programming product that provides a positive visual indication of the state of a dataset presented to a user. One skilled in the art will also understand that the invention, although described above using the "vi" text editor as a preferred embodiment is applicable to any other application that presents information to a user where the user benefits by being able to immediately identify the state of the displayed information.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for visually indicating a state of a dataset when presenting said dataset; said method comprising the steps of:

opening said dataset;

determining said state of said dataset;

presenting a background representative of said state on a display unit; and presenting a portion of said dataset with said background on said display unit, wherein said background is selected from the group consisting of, a texture, a pattern, a frame and a watermark, said background dependent on said state.

2. The computer controlled method of claim 1 wherein said dataset comprises a plurality of data within a datafile.

3. The computer controlled method of claim 2 wherein said plurality of data is textual data.

4. The computer controlled method of claim 1 wherein said state comprises indication that said dataset is a read-only dataset.

5. A system for visually indicating a state of a dataset when presenting said dataset using a computer having a display unit; said system comprising:

a data set opening mechanism configured to open said dataset;

a state determination mechanism configured to determine said state of said dataset opened by the dataset opening mechanism;

a background presentation mechanism configured to present a background representative of said state, as determined by the state determination mechanism, on said display unit; and a dataset presentation mechanism configured to present a portion of said dataset with said background on said display unit, whereby said background indicates said state of said portion of said dataset displayed on said display unit, wherein said background is selected from the group consisting of, a texture, a pattern, a frame and a watermark, said background dependent on said state.

6. The system of claim 5 wherein said dataset comprises a plurality of data within a datafile.

7. The system of claim 6 wherein said plurality of data is textual data.

8. The system of claim 5 wherein said state comprises indication that said dataset is a read-only dataset.

9. A data access apparatus for visually indicating the state of a dataset when presenting said dataset with a computer; said computer having a central processor unit (CPU), a memory and a display unit, said data access apparatus comprising:

a dataset opening mechanism configured to open said dataset;

a state determining mechanism configured to determine said state of said dataset opened by the dataset opening mechanism;

a background presentation mechanism configured to present a background representative of said state, as determined by the state determination mechanism, on said display unit; and a dataset presentation mechanism configured to present a portion of said dataset with said background on said display unit, whereby said background indicates said state of said portion of said dataset displayed on said display unit, wherein said background is selected from the group consisting of, a texture, a pattern, a frame and a watermark, said background dependent on said state.

10. The data access apparatus of claim 9 wherein said dataset comprises a plurality of data within a datafile.

11. The data access apparatus of claim 8 wherein said plurality of data is textual data.

12. The data access apparatus of claim 9 wherein said state comprises indication that said dataset is a read-only dataset.

13. A computer program product comprising:

a computer usable storage medium having computer readable code embodied therein for causing a computer to visually indicate the state of a dataset when presenting said dataset, said computer having a display unit, said computer readable code comprising:

computer readable program code devices configured to cause said computer to effect a dataset opening mechanism configured to open said dataset;

computer readable program code device configured to cause said computer to effect a state determination mechanism configured to determine said state of said dataset opened by said dataset opening mechanism;

computer readable program code device configured to cause said computer to effect a background presentation mechanism configured to display a background representative of said state, as determined by the state determination mechanism, on said display unit; and computer readable program code devices configured to cause said computer to effect a dataset presentation mechanism configured to present a portion of said dataset with said background on said display unit, whereby said background indicates said state of said portion of said dataset displayed on said display unit, wherein said background is selected from the group consisting of, a texture, a pattern, a frame and a watermark, said background dependent on said state.

14. The computer program product of claim 13 wherein said dataset comprises a plurality of data within a datafile.

15. The computer program product of claim 10 wherein said plurality of data is textual data.

16. The computer program product of claim 13 wherein said state comprises indication that said dataset is a read-only dataset.

* * * * *